United States Patent
Ko

(10) Patent No.: US 11,325,635 B2
(45) Date of Patent: May 10, 2022

(54) FOLDABLE STEERING WHEEL ASSEMBLY AND STEERING APPARATUS COMPRISING THE SAME

(71) Applicant: Mando Corporation, Pyeongtaek-si (KR)

(72) Inventor: Bong Sung Ko, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 17/226,261

(22) Filed: Apr. 9, 2021

(65) Prior Publication Data
US 2021/0316776 A1   Oct. 14, 2021

(30) Foreign Application Priority Data

Apr. 9, 2020   (KR) .......................... 10-2020-0043388
Apr. 7, 2021   (KR) .......................... 10-2021-0045490

(51) Int. Cl.
*B62D 1/06*   (2006.01)
*B62D 1/16*   (2006.01)

(52) U.S. Cl.
CPC ................. *B62D 1/06* (2013.01); *B62D 1/16* (2013.01)

(58) Field of Classification Search
CPC ... B62D 1/04; B62D 1/06; B62D 1/08; B62D 1/10; B62D 1/105; B62D 1/11; B62D 1/181; B62D 1/185; B62D 1/19; B60R 21/09
See application file for complete search history.

(56) References Cited

U.S. PATENT DOCUMENTS

| | | | | |
|---|---|---|---|---|
| 1,426,773 A * | 8/1922 | Merrit | ...................... | B62D 1/04 74/556 |
| 1,459,957 A * | 6/1923 | Merritt | ...................... | B62D 1/04 74/555 |
| 2,326,131 A * | 8/1943 | Eschelbacher | .......... | B62D 1/06 74/493 |
| 2,379,492 A * | 7/1945 | Micuta | ...................... | B62D 1/04 74/555 |
| 3,583,255 A * | 6/1971 | Curcuru | .................. | B62D 1/11 74/552 |

(Continued)

FOREIGN PATENT DOCUMENTS

DE   102017203223 A1 *   8/2018   ............... B62D 1/04
DE   102017209499 A1     12/2018

OTHER PUBLICATIONS

"Hinge," Wikipedia Page, dated by Wayback Machine to Dec. 10, 2019, url:<https://web.archive.org/web/20191210010030/https://en.wikipedia.org/wiki/Hinge>.*

(Continued)

*Primary Examiner* — Richard W Ridley
*Assistant Examiner* — Brian J McGovern
(74) *Attorney, Agent, or Firm* — Hauptman Ham, LLP

(57) ABSTRACT

Embodiments may allow the steering wheel to be received in a vehicle body to secure a space for the driver's seat in autonomous driving mode and prevent the steering wheel from interfering with the driver's body, thereby allowing for the driver's comfortable movement while preventing the driver from intervening in steering. It is also possible to implement a further simplified folding structure of the steering wheel, providing more advantages in terms of costs and space.

7 Claims, 10 Drawing Sheets

(56) References Cited

U.S. PATENT DOCUMENTS

| | | | | |
|---|---|---|---|---|
| 4,608,550 | A * | 8/1986 | Umebayashi | B60R 16/027 |
| | | | | 180/78 |
| 5,275,066 | A * | 1/1994 | Hancock | B62D 1/181 |
| | | | | 180/78 |
| 2012/0006141 | A1* | 1/2012 | Stauffer | B62D 1/185 |
| | | | | 74/493 |
| 2018/0319419 | A1* | 11/2018 | Kreutz | B62D 5/001 |
| 2019/0071113 | A1* | 3/2019 | Board | B62D 1/11 |
| 2020/0122767 | A1* | 4/2020 | Reidel | B62D 1/08 |
| 2021/0016820 | A1* | 1/2021 | Nozawa | B62D 1/181 |
| 2021/0129891 | A1* | 5/2021 | Ryne | B62D 1/181 |
| 2021/0171086 | A1* | 6/2021 | Kurokawa | B60Q 9/00 |
| 2021/0323594 | A1* | 10/2021 | Helmstetter | B60R 21/203 |
| 2021/0339792 | A1* | 11/2021 | Kwon | B62D 1/185 |

OTHER PUBLICATIONS

Machine Translation of DE 10 2017 203 223, obtained Dec. 1, 2021.*

German Office Action dated Dec. 11, 2021, in connection with the Germany Patent Application No. 102021203504.3 citing the above reference(s).

* cited by examiner (B)

FOLDABLE STEERING WHEEL ASSEMBLY AND STEERING APPARATUS COMPRISING THE SAME

CROSS-REFERENCE TO RELATED APPLICATION

This application claims priority from Korean Patent Application Nos. 10-2020-0043388, filed on Apr. 9, 2020 and 10-2021-0045490, filed on Apr. 7, 2021 which are hereby incorporated by reference for all purposes as if fully set forth herein.

BACKGROUND

Field

Embodiments relate to a foldable steering wheel assembly and a steering apparatus including the same, and more specifically, to a foldable steering wheel assembly in which a steering wheel may be received in a vehicle body to secure a space for the driver's seat in autonomous driving mode and to prevent the steering wheel from interfering with the driver's body, thereby allowing for the driver's comfortable movement while preventing the driver from intervening in steering, and having a further simplified folding structure of the steering wheel to have more advantages in terms of costs and space, and a steering apparatus including the foldable steering wheel assembly.

Description of Related Art

In recent years, there have been developed automobiles that may navigate to the destination without the driver's manipulation of the steering wheel, accelerator pedal, and brake.

An autonomous vehicle may drive in driver driving mode or autonomous driving mode. In driver driving mode, the driver performs driving. In autonomous driving mode, driving is automatically performed by the autonomous driving system. There is demand for securing a larger space for convenience of the driver during autonomous driving.

If the driving wheel which is positioned in front of the driver is received in the vehicle body in autonomous driving mode, the driver would have more convenience in driving. Since the autonomous vehicle drives in driver driving mode or autonomous driving mode, a need exists for a driving wheel structure that allows the driver to manipulate the driving wheel in driver driving mode, as do conventional, non-autonomous vehicles and that may easily be received in the vehicle body in driver driving mode.

BRIEF SUMMARY

According to embodiments of the disclosure, there are provided a foldable steering wheel assembly and a steering apparatus including the same, and more specifically, to a foldable steering wheel assembly in which a steering wheel may be received in a vehicle body to secure a space for the driver's seat in autonomous driving mode and to prevent the steering wheel from interfering with the driver's body, thereby allowing for the driver's comfortable movement while preventing the driver from intervening in steering, and having a further simplified folding structure of the steering wheel to have more advantages in terms of costs and space, and a steering apparatus including the foldable steering wheel assembly.

According to an embodiment, there may be provided a foldable steering wheel assembly, comprising a fixed part coupled to a steering column, a moving part movably coupled to the steering column in an axial direction, at least one first rod having a first end hinged to the fixed part, at least one rim segment coupled to a second end of the at least one first rod, and a second rod having a first end hinged to the moving part and a second end hinged to the at least one first rod.

Embodiments may allow the steering wheel to be received in a vehicle body to secure a space for the driver's seat in autonomous driving mode and prevent the steering wheel from interfering with the driver's body, thereby allowing for the driver's comfortable movement while preventing the driver from intervening in steering. It is also possible to implement a further simplified folding structure of the steering wheel, providing more advantages in terms of costs and space.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
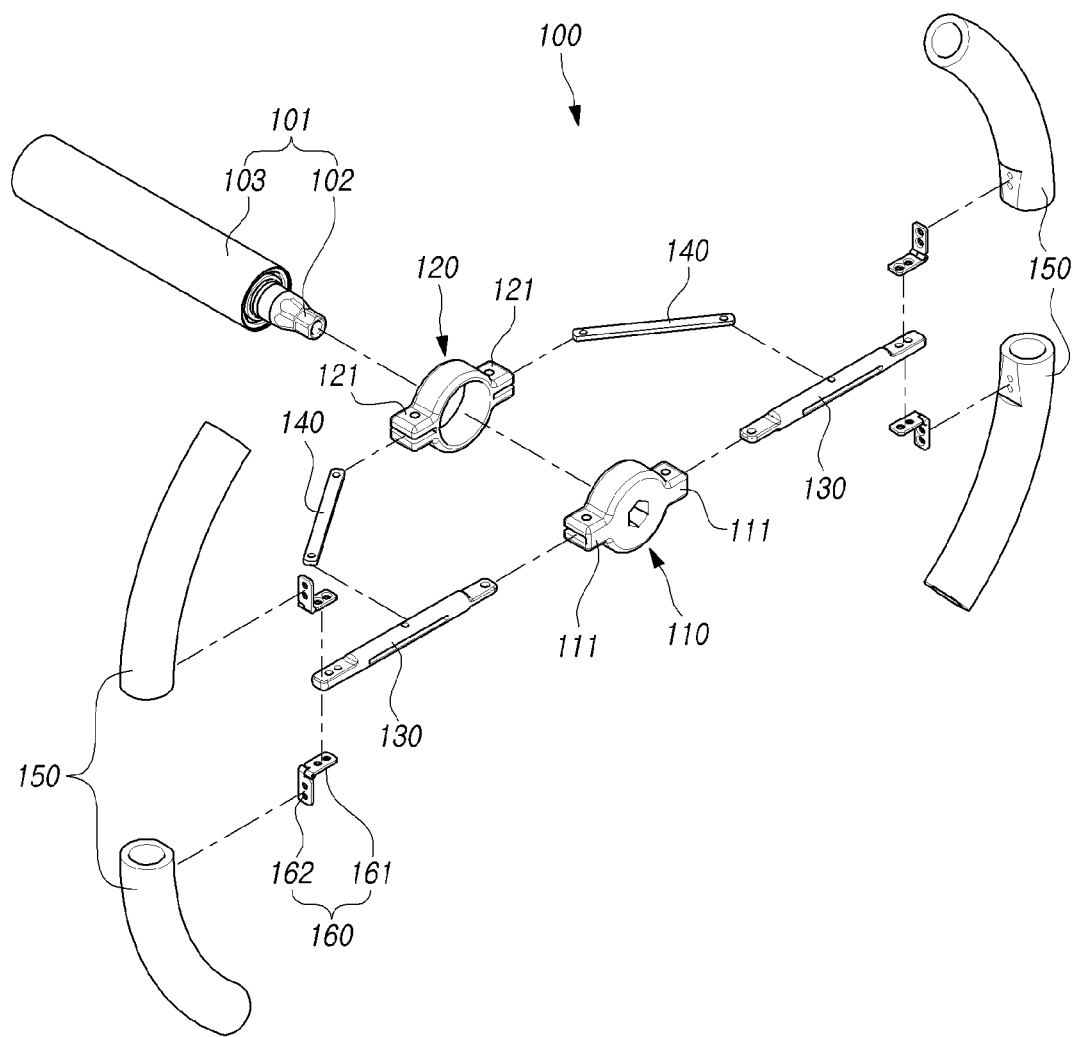
FIG. 1 is an exploded perspective view illustrating a foldable steering wheel assembly according to according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
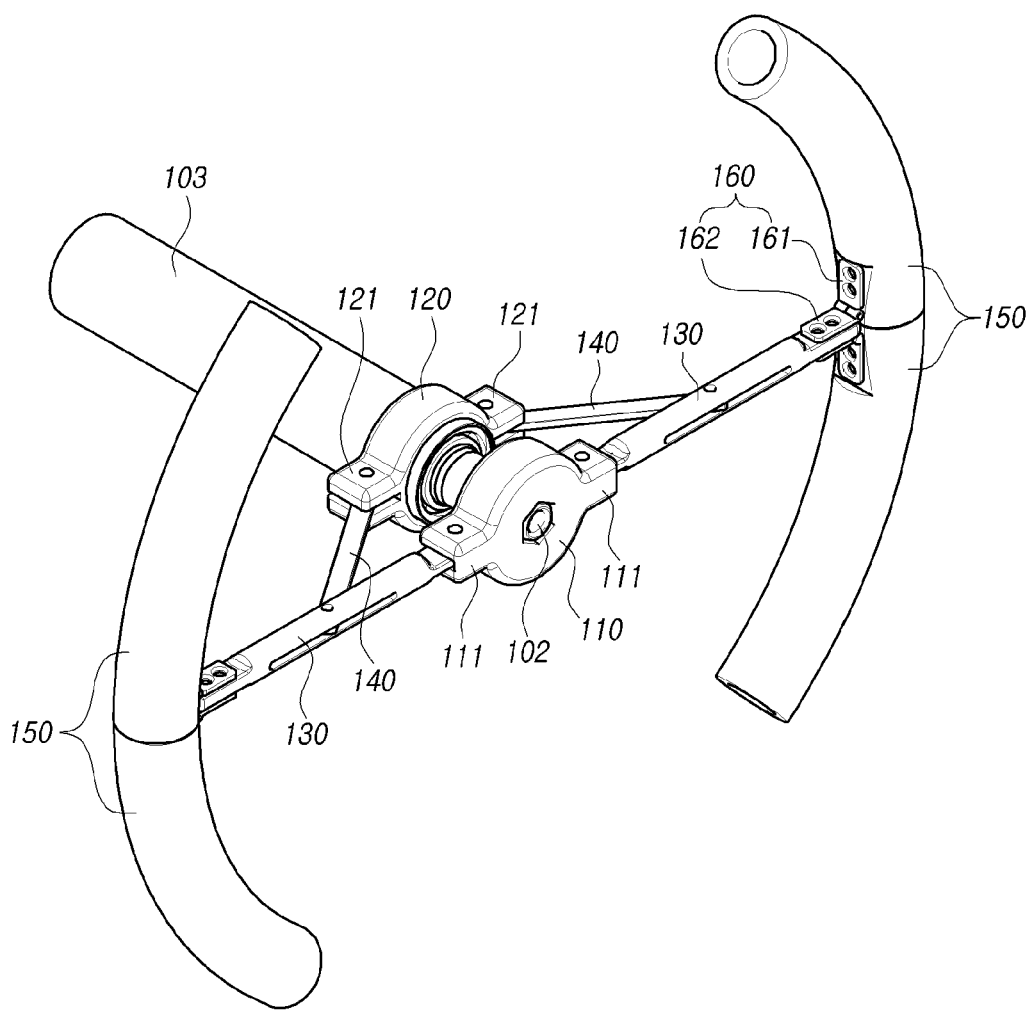
FIG. 2 is a perspective view illustrating an assembled state of the foldable steering wheel assembly of FIG. 1.

FIG. 1 is an exploded perspective view illustrating a foldable steering wheel assembly according to according to an embodiment. FIG. 2 is a perspective view illustrating an assembled state of the foldable steering wheel assembly of FIG. 1. FIGS. 3A, 3B, 4A, 4B, 5A, 5B and 5C are views illustrating an operation state of a foldable steering wheel assembly according to an embodiment. FIG. 6 is a plan view illustrating a steering apparatus according to an embodiment.

According to an embodiment, a foldable steering wheel assembly 100 includes a fixed part 110 coupled to a steering column 101, a moving part 120 coupled to the steering column 101 to be movable in an axial direction, first rods 130 having first ends hinged to the fixed part 110, rim segments 150 coupled to second ends of the first rods 130, and second rods 140 having first ends hinged to the moving part 120 and second ends hinged to the first rods 130.

According to an embodiment, there may be provided a steering apparatus including the foldable steering wheel assembly 100.

According to an embodiment, the foldable steering wheel assembly 100 includes the fixed part 110 that is coupled to the steering column 101 and fixed in the axial direction, the moving part 120 that is movably coupled to the steering column 101 in the axial direction, and the rim segments 150 that are parts of the rim of the steering wheel.

Referring to FIGS. 1 to 2, the fixed part 110 and the moving part 120 are coupled to the steering column 101 and connected by the first rods 130 and the second rods 140. The rim segments 150 are connected to the fixed part 110 by the first rods 130.

The fixed part 110 may be coupled to a steering shaft 102, and the moving part 120 may be coupled to an upper tube 103. The fixed part 110 may have a hole into which an end of the steering shaft 102 may be inserted and may thereby be coupled to the steering shaft 102. The moving part 120 may have a hole that has an inner diameter corresponding to the outer diameter of the upper tube 103 and may thereby be coupled with the upper tube 103. Accordingly, the moving part 120 may be moved in the axial direction on the outer circumferential surface of the upper tube 103, and the fixed part 110 is fixed in the axial direction when the moving part 120 is moved.

According to an embodiment, the foldable steering wheel assembly 100 switches between an unfolded state (refer to FIG. 5A) and a folded state (refer to FIG. 5C), which may be manipulated by the driver, as the rim segments 150 rotates about the first rods 130 and the moving part 120 slides over the steering column 101 while the first rods 130 and the second rods 140, respectively, rotate about the fixed part 110 and the moving part 120.

As illustrated in the drawings, the moving part 120 may be positioned ahead of the fixed part 110 on the steering column 101. In other words, when the moving part 120 is moved to switch the steering wheel to the unfolded state or the folded state, the moving part 120 is moved on the steering column 101 but does not project toward the driver. Therefore, upon switching between the states, the steering wheel does not invade the space of the driver's seat, and the driver is thus freed from inconvenience.

In the folded state, the steering wheel may be telescoped in and received in the vehicle body by, e.g., a telescopic actuator in the steering column.

Described below are the operation of the rim segments 150, followed by the operation of the first rods 130 and the second rods 140 by the movement of the moving part 120.

As illustrated in FIGS. 1 and 2, the rim segments 150 form the rim of the steering wheel in the unfolded state of the foldable steering wheel assembly 100 according to an embodiment. The rim segments 150 are parts of the rim. The rim of the steering wheel is split into a plurality of rim segments 150, and each rim segment 150 is hinged to the first rod 130. Although the drawings illustrate an embodiment in which the rim is split into four rim segments, a modification may be appropriately made thereto as necessary. Further, although the drawings illustrate an embodiment in which all of the four rim segments have the same shape, a modification may be appropriately made thereto as necessary.

A pair of rim segments 150 may be coupled to the second end of the first rod 130. The pair of rim segments 150 may be coupled to the upper and lower sides of the first rod 130. As described below, the rim segments 150 may be hinged to the first rods 130 and rotated. The pair of rim segments 150, the first ends of which are hinged to the upper and lower sides of the first rod 130, may be rotated about the first rod 130 in the direction along which their second ends get closer to or away from each other.

Figure 3A:
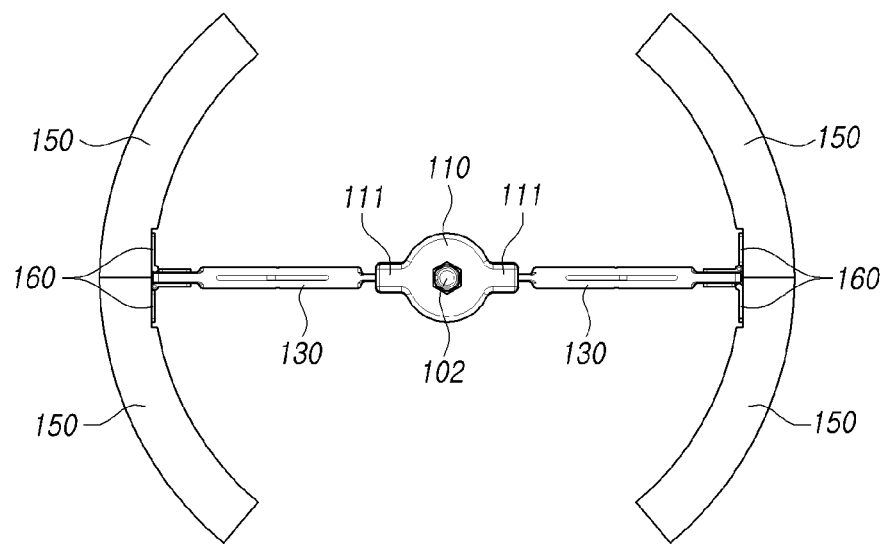
FIGS. 3A, 3B, 4A, 4B, 5A, 5B and 5C are views illustrating an operation state of a foldable steering wheel assembly according to an embodiment.
Figure 3B:
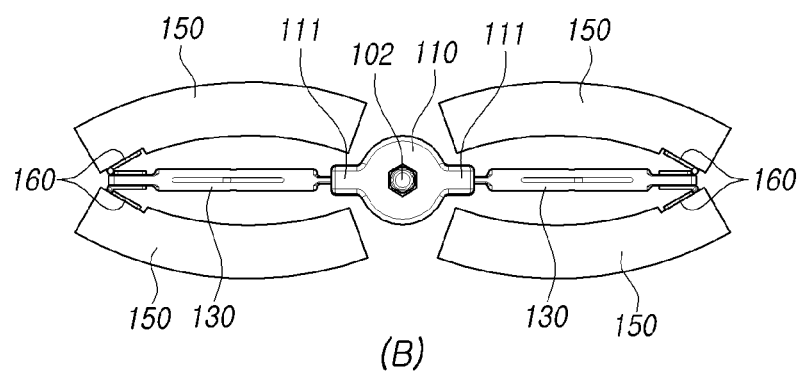

The rim segments 150 are hinged to the second end of the first rod 130 and, as switching from the unfolded state to the folded state, rotate about the first rod 130. Specifically, as illustrated in FIGS. 3A to 3B, the second ends of the rim segments 150 are rotated about the first ends coupled to the first rod 130 to get closer to or far away from each other. FIG. 3A illustrates a state in which the rim segments 150 are rotated away from the first rods 130, and FIG. 3B illustrates a state in which the rim segments 150 are rotated to be close to the first rods 130.

The first rods 130 and the rim segments 150 may be hinged together by brackets 160. Specifically, the first rod 130 and the rim segment 150 are coupled by the brackets 160, and the brackets 160 include a first coupling part 161 coupled to the first rod 130 and a second coupling part 162 coupled to the rim segment 150 and the first coupling part 161 and the second coupling part 162 hinged together (refer to FIG. 1). The first coupling part 161 and the second coupling part 162 each may be shaped as a plate and may be coupled to the first rod 130 and the rim segment 150, respectively, by, e.g., bolting, although not shown in the drawings for convenience of illustration.

Figure 4A:
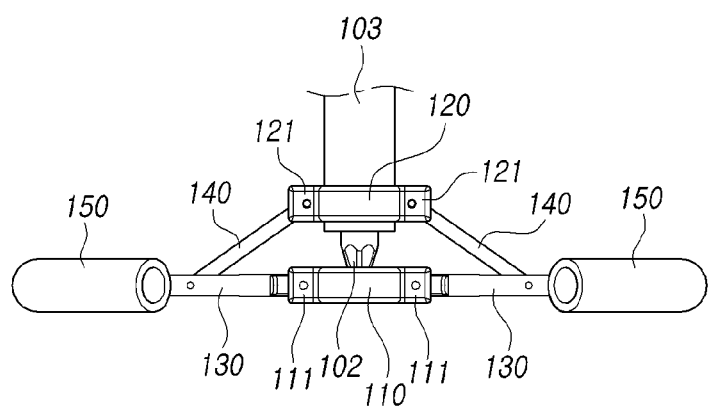
Figure 4B:
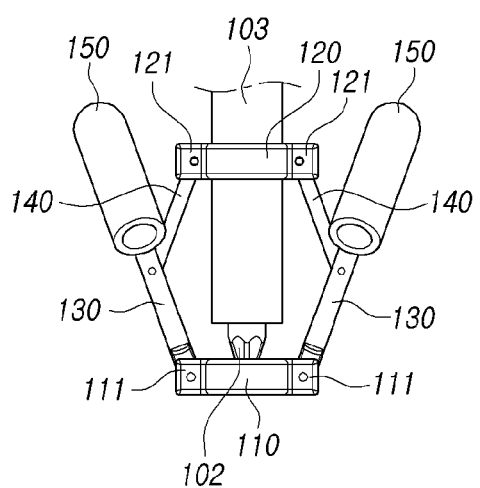

Referring to FIGS. 1, 4A and 4B, the first end of the first rod 130 is hinged to the fixed part 110, and the second end of the first rod 130 is rotated about the first end coupled to the fixed part 110 in the direction toward the steering column 101 or in the opposite direction.

The fixed part 110 has a hinge portion 111 to which the first end of the first rod 130 is hinged, and the hinge portion 111 has a slit into which the first end of the first rod 130 is inserted. The first end of the first rod 130, inserted into the slit of the hinge portion 111, may be hinged to the hinge portion 111 by, e.g. a pin, although not shown in the drawings for convenience of illustration. The slit formed in the hinge portion 111 of the fixed part 110 is opened in the front but closed in the rear, so that the first rod 130 may be stopped from rotating backward when the first rod 130 is coupled to the hinge portion 111 and rotated.

There may be provided a pair of first rods 130, the respective first ends of which may be hinged to the fixed part 110. The pair of first rods 130 may be located on opposite sides with the fixed part 110 interposed therebetween. In other words, as illustrated in the drawings, in the unfolded state of the steering wheel, the pair of first rods 130 may be positioned on a straight line. Since the rim segments 150 are coupled to the second ends of the pair of first rods 130, the rim segments 150 coupled to the first rods 130 may be positioned to face each other in the unfolded state.

Both ends of the second rod 140 are hinged to the moving part 120 and the first rod 130, respectively. Like the fixed part 110, the moving part 120 has hinge portions 121 hinged to the first ends of the second rods 140, and the hinge portions 121 have slits into which the first ends of the second rods 140 are inserted. The first rods 130 have slots into which the second ends of the second rods 140 are inserted. The first ends of the second rods 140 inserted into the slits of the hinge portions 121 and the second ends of the second rods 140 inserted into the slits of the first rods 130 may be hinged to the hinge portions 121 by, e.g., pins.

The rotation of the first rods 130 and the second rods 140 is performed by the movement of the moving part 120. Since the moving part 120 is located ahead of the fixed part 110 in the axial direction on the steering column 101, the rim segments 150 coupled to the second ends of the first rods 130 are moved forward when the moving part 120 is moved.

The steering wheel is switched to the unfolded state or folded state by the rotation of the rim segments 150 about the first rods 130 and the rotation of the first rods 130 and the second rods 140 by the movement of the moving part 120. The rotation of the rim segments 150 and the rotation of the first rods 130 and the second rods 140 may be performed independently. The rotation of the rim segments 150 and the rotation of the first rods 130 and the second rods 140 when the steering wheel switches from the unfolded state to the folded state or from the folded state to the unfolded state are not limited as performed in a specific order, but one thereof may be performed earlier than the other or the operations may be at least partially performed simultaneously.

Figure 5A:
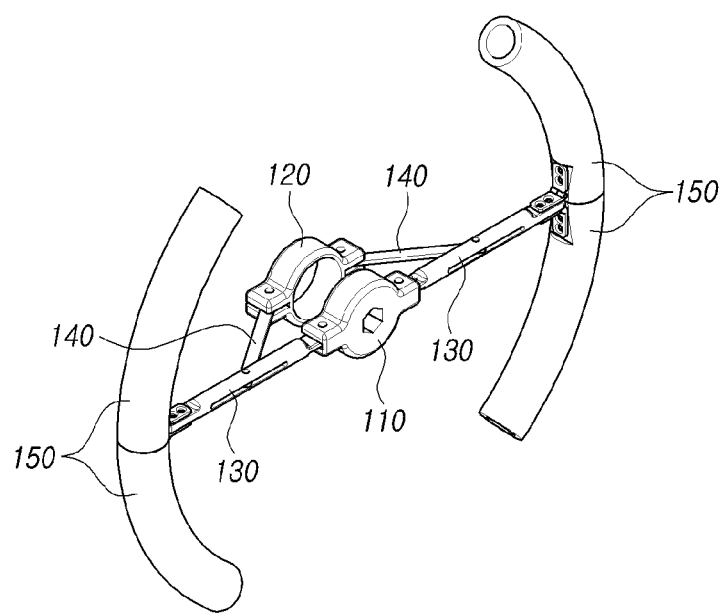
Figure 5B:
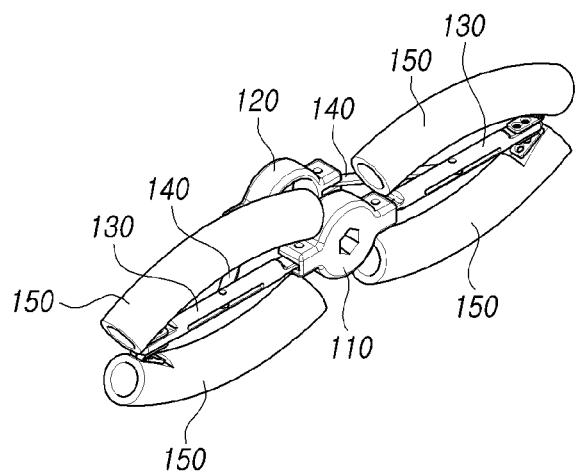
Figure 5C:
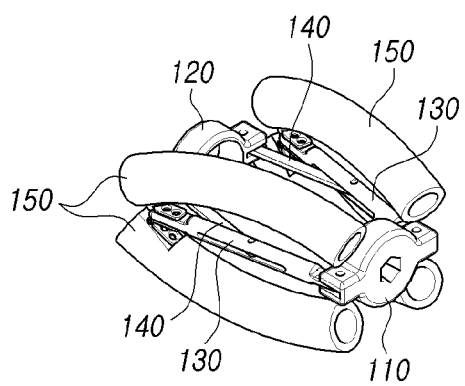
Figure 6:
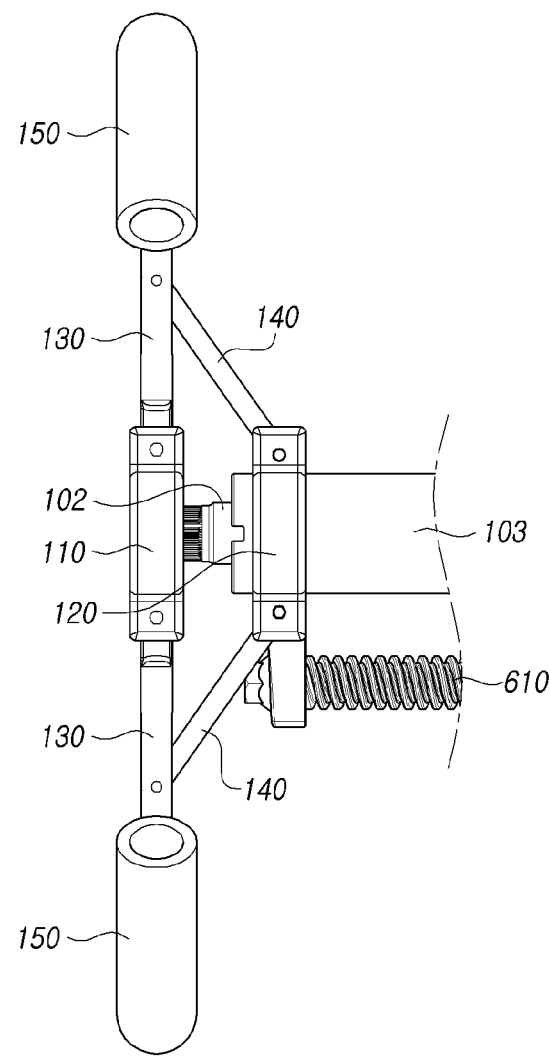
FIG. 6 is a plan view illustrating a steering apparatus according to an embodiment.

In other words, referring to FIGS. 5A to 5C, while switching from the unfolded state to the folded state, the rotation of the rim segments 150 may be performed, and the rotation of the first rods 130 and the second rods 140 may then be performed. In the opposite order, while switching from the folded state to the unfolded state, the rotation of the first rods 130 and the second rods 140 may be performed, and the rotation of the rim segments 150 may then be performed.

Unlike in FIGS. 5A to 5C, while switching from the unfolded state to the folded state, the rotation of the first rods 130 and the second rods 140 is performed, and the rotation of the rim segments 150 may then be performed. In the opposite order, while switching from the folded state to the unfolded state, the rotation of the rim segments 150 may be performed, and the rotation of the first rods 130 and the second rods 140 may then be performed.

Alternatively, while switching from the unfolded state to the folded state and from the folded state to the unfolded state, the rotation of the rim segments 150 and the rotation of the first rods 130 and the second rods 140 may simultaneously be performed or may be performed partially simultaneously.

The rotation of the rim segments 150 and the rotation of the first rods 130 and the second rods 140 may be performed by the driver's manipulation or an actuator. In other words, the steering apparatus according to an embodiment may include an actuator for rotating the rim segments 150 or an actuator for moving the moving part 120 in the axial direction.

The rotation of the rim segments 150 about the first rods 130 may be performed by the torque applied to each rim segment 150 by the driver or by an actuator applying torque to the rim segments 150. The actuator for rotating the rim segments 150 may include, e.g., a motor and a gear.

The rotation of the first rods 130 and the second rods 140 may be performed by the torque applied to the first rods 130 by the driver or an actuator for moving the moving part 120 on the steering column 101.

Referring to FIG. 6, the movement of the moving part 120 may be performed by a bolt screw 610 coupled to the moving part 120 and an actuator (not shown) for rotating a nut screw (not shown) engaged with the bolt screw 610. The bolt screw 610 is coupled to the moving part 120 and, as the bolt screw 610 is moved along the axial direction by the rotation of the nut screw by the actuator, the moving part 120 may be moved.

The foldable steering wheel assembly having the above described shape and the steering apparatus including the same may allow the steering wheel to be received in a vehicle body to secure a space for the driver's seat in autonomous driving mode and prevent the steering wheel from interfering with the driver's body, thereby allowing for the driver's comfortable movement while preventing the driver from intervening in steering. It is also possible to implement a further simplified folding structure of the steering wheel, providing more advantages in terms of costs and space.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A foldable steering wheel assembly, comprising:
a fixed part coupled to a steering column;
a moving part movably coupled to the steering column in an axial direction;
a first rod having a first end hinged to the fixed part;
a first pair of rim segments hinged to a second end of the first rod; and
a second rod having a first end hinged to the moving part and a second end hinged to the first rod,
wherein the second end of the first rod is configured to be rotated toward or away from the steering column about the first end coupled to the fixed part, and
wherein each segment of the first pair of rim segments is configured to be folded toward the first end of the first rod by a hinge at the second end of the first rod so that the first pair of rim segments are positioned on opposite sides with the first rod therebetween.

2. The foldable steering wheel assembly of claim 1, wherein the fixed part is coupled to a steering shaft of the steering column.

3. The foldable steering wheel assembly of claim 1, wherein the moving part is coupled to an upper tube of the steering column.

4. The foldable steering wheel assembly of claim 1, wherein the moving part is positioned ahead of the fixed part on the steering column.

5. The foldable steering wheel assembly of claim 1, further comprising:
a third rod having a first end hinged to the fixed part;
a second pair of rim segments coupled to a second end of the third rod; and
a fourth rod having a first end hinged to the moving part and a second end hinged to the third rod,
wherein the second end of the third rod is configured to be rotated toward or away from the steering column about the first end coupled to the fixed part,
wherein each segment of the second pair of rim segments is configured to be folded toward the first end of the third rod by a hinge at the second end of the third rod so that the second pair of rim segments are positioned on opposite sides with the third rod therebetween.

6. The foldable steering wheel assembly of claim 1,
wherein the first rod and the first pair of rim segments are coupled by a bracket,
wherein the bracket includes a first coupling part coupled to the first rod and a second coupling part coupled to the first pair of rim segments, and
wherein the first coupling part and the second coupling part hinged to each other.

7. A steering apparatus including the foldable steering wheel assembly, comprising:
a fixed part coupled to a steering column;
a moving part movably coupled to the steering column in an axial direction;
a first rod having a first end hinged to the fixed part;
a first pair of rim segments hinged to a second end of the first rod; and
a second rod having a first end hinged to the moving part and a second end hinged to the first rod,
wherein the second end of the first rod is configured to be rotated toward or away from the steering column about the first end coupled to the fixed part, and
wherein each segment of the first pair of rim segments is configured to be folded toward the first end of the first rod by a hinge at the second end of the first rod so that the first pair of rim segments are positioned on opposite sides with the first rod therebetween.

* * * * *